United States Patent [19]
Jenkins

[11] Patent Number: 4,561,408
[45] Date of Patent: Dec. 31, 1985

[54] MOTORIZED FLOW CONTROL VALVE

[75] Inventor: Patrick A. Jenkins, Decatur, Ill.

[73] Assignee: Borg-Warner Corporation, Chicago, Ill.

[21] Appl. No.: 573,175

[22] Filed: Jan. 23, 1984

[51] Int. Cl.⁴ .......................................... F02M 25/06
[52] U.S. Cl. .................................................. 123/571
[58] Field of Search ................ 123/568, 571; 251/133, 251/251

[56]  References Cited
U.S. PATENT DOCUMENTS

| | | | |
|---|---|---|---|
| 1,989,942 | 2/1935 | Parks et al. | 137/139 |
| 3,675,633 | 7/1972 | Nakajima et al. | 123/568 |
| 3,807,375 | 4/1974 | Hertfelder | 123/568 |
| 3,839,662 | 10/1974 | N'Guyen Van | 318/160 |
| 4,027,636 | 6/1977 | Yamamoto et al. | 123/568 |
| 4,064,851 | 12/1977 | Wessel | 123/571 |
| 4,094,285 | 6/1978 | Oyama et al. | 123/568 |
| 4,158,351 | 6/1979 | Ando et al. | 123/568 |
| 4,233,946 | 11/1980 | Yorioka et al. | 123/568 |
| 4,333,440 | 6/1982 | Eheim | 123/571 |

FOREIGN PATENT DOCUMENTS 1183844  3/1970  United Kingdom ................ 251/133

Primary Examiner—Craig R. Feinberg
Assistant Examiner—W. R. Wolfe
Attorney, Agent, or Firm—Florian S. Gregorczyk

[57]  ABSTRACT

The invention teaches the use of a cam-operated valve control means, which cam is moved by an electrical motor in response to an operating signal. Such valve control means finds particular application in an exhaust gas recirculation system or idle speed control for an automobile engine.

8 Claims, 3 Drawing Figures

MOTORIZED FLOW CONTROL VALVE

BACKGROUND OF THE INVENTION

The invention relates to a control valve and finds particular application in the control of exhaust gas recirculation (EGR) valves or in the control of idle speed devices for internal combustion engines.

Control of exhaust gas recirculation in internal combustion engines has been utilized to reduce the amount of harmful oxides of nitrogen (NOX) components in such exhaust. In the prior art, some devices are controlled by various engine parameters and cooperate with such engines to recirculate exhaust gases to reduce NOX components in the exhaust gases. However, these earlier devices are almost universally operable by a diaphragm operator responsive to a vacuum or pressure differential signal. Such a signal is often derived from the engine manifold vacuum. This interruption of the manifold vacuum interferes with the fuel-air mixture to the internal combustion chambers. Such interference in the fuel-air balance leads to further disturbance in the equilibrium or stoichiometry of the combustion mixture for such engines. NOX output in the exhaust may be reduced by not disturbing the vacuum signal. The present invention provides a positive control for valves used in EGR system without disturbing the air-fuel mixture or bleeding-off the manifold vacuum. Such control means also are useful in the control of idle speed circuits. U.S. Pat. No. 3,977,375 (Laprade et al) is illustrative of the prior art wherein EGR valves are controlled by a vacuum signal wherein an exhaust gas recirculation valve is controlled in response to a signal in the exhaust pipe. Such signal is delivered from a sensor to an electromagnetic valve to control the vacuum from a proportioning device to a diaphragm biased by a spring. The diaphragm is connected to an EGR valve to thereby allow recirculation from said exhaust to the inlet manifold. This type of vacuum control is prevalent throughout the prior art. That is, the control of a vacuum signal to a diaphragm operator to modulate the EGR valve.

An alternative control for an EGR system is illustrated in U.S. Pat. No. 4,175,522 (Kawamura et al) wherein a cam operated valve and a expansion manifold system are connected such that exhaust gas is expanded into the manifold through one of the cam operator valves and thereafter into the auxiliary combustion chamber of a cylinder via a second open cam operated valve. These cam operated valves are hydraulically actuated through a solenoid control valve. This solenoid controller is energized under high load conditions to establish a hydraulic path which returns oil to the sump and under this high load condition the cam operated valves do not open.

U.S. Pat. No. 4,233,946 (Yorioka et al) describes an exhaust gas recirculation system for an internal combustion engine wherein a variable restriction connection is provided between an intake pipe and a control valve through a cam actuator. In this situation a throttle or constriction in an intake pipe is connected by a link to a cam so that the opening area of a variable constriction has a definite relationship to a throttle valve. This link and cam connection is moved to vary the flow to a diaphragm operated EGR valve; thus this is a controlled valve, operable to again control a diaphragm operator of an EGR valve. This arrangement provides no direct link to such an EGR valve.

U.S. Pat. No. 4,411,242 (Igashira et al) teaches a method for controlling an EGR valve in an internal combustion engine based upon detection of the fuel amount by a sensor in line with the predetermined EGR rate equation. The controller as illustrated in the figure is a pressure controlling valve 6 which is shown as an electromagnetic valve or solenoid valve.

According to the present invention there is provided a direct drive to a valve independent of manifold vacuum to thereby avoid disturbance of the fuel/air mixture to the engine while still providing a means to introduce exhaust gas to reduce the amount of harmful NOX discharged to the atmosphere. The valve is responsive to a signal from a sensor which may be responsive to one or more engine operating parameters such as oxygen content, engine revolutions, vehicle speed, exhaust gas pressure or some other major parameter. The present invention provides a motor operator and a cam and stem arrangement to control flow past a valve pintle.

BRIEF DESCRIPTION OF THE DRAWING

In the figures of the drawing like reference numerals identify like components, and in the drawing.

DETAILED DESCRIPTION OF THE INVENTION

Figure 1:
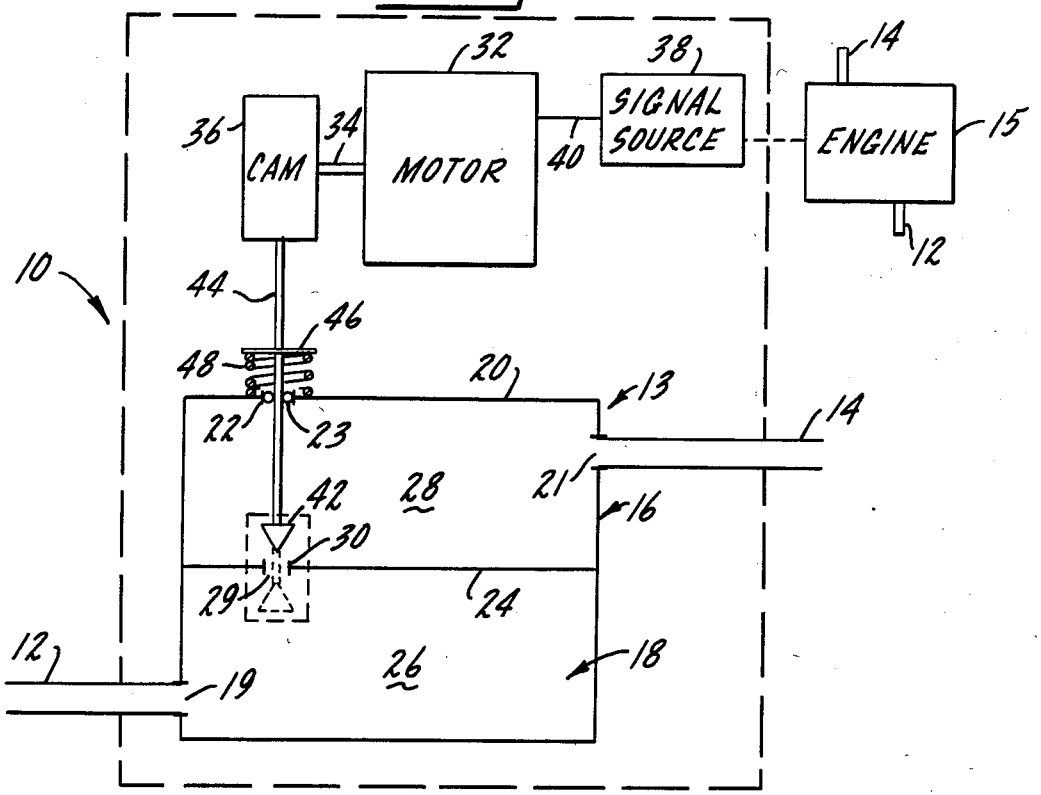
FIG. 1 is a schematic diagram of an embodiment of a valve control system in an EGR circuit.

Referring to FIG. 1, a control system 10 for an EGR circuit includes a drive or motor means 32 and a valve assembly 13. This valve assembly is coupled between an exhaust conduit 12 and an intake manifold conduit 14 of an internal combustion (I/C) engine 15. Assembly 13 includes a housing 16 defining a cavity 18, a top surface 20, and a stem bore 22 with a stem seal means 23 through surface 20. Seal means 23 seals fluid flow through bore 22. A separating plate 24 is positioned in cavity 16 and cooperates with housing 16 to define an inlet chamber 26 and an exhaust or discharge chamber 28. The separator 24 and housing 16 further cooperate to define a bore 29 communicating between inlet chamber 26 and discharge chamber 28, and having a valve seat 30 about bore 29. Housing 16 further defines an inlet port 19 communicating with exhaust conduit 12 and inlet chamber 26, and a discharge port 21 communicating with discharge chamber 28 and intake manifold conduit 14.

Figure 2:
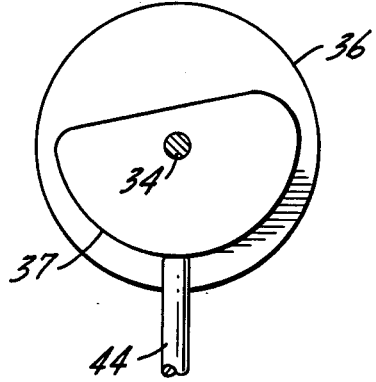
FIG. 2 is an illustration of a cam operator in contact with a stem.

Motor means 32 of control system 10 has a shaft 34 extending therefrom with a cam operator 36 having a cam profile 37 (FIG. 2) mounted on and operable by shaft 34. Motor means 32 may be any electrically driven motor, such as a direct current or stepper motor, connected to a signal source 38, such as an electronic computer, over a conductor or cable 40. Signal source 38 monitors engine 15 parameters such as temperature, revolution per minute, or pressure. Signal source 38 provides a drive signal over conductor 40 to motor 32 to move drive shaft 34 in response to a sensed engine parameter. Motor 32 is energized by any means (not shown) known in the art.

A valve means 42 is provided in either discharge chamber 28 or inlet chamber 26 to seal flow past bore seat 30. A stem 44 extends from valve pintle 42 through stem bore 22 to contact cam profile 37. A keeper plate 46 is connected to and operable with stem 44, and this plate is shown in FIG. 1 as parallel to top surface 20 of housing 16. Positioned about stem 44 between keeper 46 and top surface 20 is a bias spring 48 which provides in this embodiment, a bias force to stem 44. Further, bias spring 48 maintains valve 42 seated against seat 30 in a reference position for a normally closed valve. Bias spring 48 may also be positioned within housing 16 to bias valve 42.

The control system 10 of FIG. 1 operates stepper motor 32 in response to a drive signal from signal source 38 to move the cam operator 36. In the normally closed embodiment stem 44 tracks cam profile 37 to open valve 42, to allow flow past valve seat 30 and bore 29. In this embodiment exhaust gas is provided from exhaust conduit 12 through inlet port 19 of valve housing 16. Normally-closed valve 42 is opened by the actuation of the stepper motor 32 in response to a drive signal from signal source 38, to permit gas flow past seat 30 through discharge port 21 to manifold conduit 14, and thus to the engine 15. The signal source 38, as known in this art, may be an on-board computer of an automobile. Such drive signal may be derived from the oxygen content of the exhaust gas, engine speed (rpm), exhaust gas temperature or some other parameter. Further signals from source 38 would continue to drive cam 36 to allow bias spring 48 and stem 44 to close valve 42 in response to changes in the position of cam 36.

Figure 3:
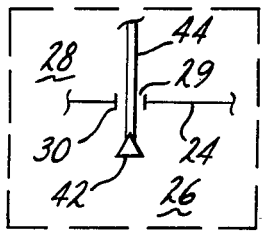
FIG. 3 illustrates an alternative position for the valve of the valve control system of FIG. 1.

In FIG. 1 a normally-open valve 42 is illustrated in discharge chamber 28. An alternative valve 42 is illustrated in FIG. 3, wherein valve 42 in inlet chamber 26 would be a normally-closed valve.

While only a particular embodiment of the present invention has been shown and described, it is manifest that this is in no way limiting on the scope of the invention described herein.

I claim:

1. A valve control system for an exhaust gas recirculation system comprising:
   a valve assembly having a housing with a wall which defines a cavity, an inlet port, a discharge port, a top surface and a stem bore with a seal means positioned in said stem bore;
   drive means, including a stepper motor having a drive shaft extending therefrom and operable by said stepper motor;
   a cam operator connected for operation by said drive shaft;
   a separator mounted in said cavity and cooperating with said wall to define a discharge chamber and an inlet chamber,
      said discharge port communicating with said discharge chamber,
      said inlet port communicating with said inlet chamber,
   said separator also defining a valve seat and a separator bore communicating between said discharge and inlet chambers;
   a valve positioned in said discharge chamber and operable to seal said separator bore, said valve having a stem extending through said stem bore seal means to contact said cam operator;
   a keeper plate mounted on said stem between said cam operator and said housing wall; and
   a bias spring between said keeper plate and housing top surface to urge said valve into contact with said valve seat to seal said separator bore.

2. A valve control system for an exhaust gas recirculation system as claimed in claim 1 wherein said valve positioned in said discharge chamber contacts and closes said separator bore in a reference position.

3. A valve control system for an exhaust gas recirculation system comprising:
   a valve assembly having a housing with a wall which defines a cavity, an inlet port, a discharge port, a top surface, and a stem bore with a seal means positioned in said stem bore;
   drive means, including a stepper motor having a drive shaft extending therefrom and operable by said stepper motor;
   a cam operator connected for operation by said drive shaft;
   a separator mounted in said cavity and cooperating with said wall to define a discharge chamber and an inlet chamber,
      said discharge port communicating with said discharge chamber,
      said inlet port communicating with said inlet chamber,
   said separator also defining a valve seat and a separator bore communicating between said discharge and inlet chambers;
   a valve positioned in said inlet chamber and operable to seal said separator bore, said valve having a stem extending through said stem bore seal means to contact said cam operator;
   a keeper plate mounted on said stem between said cam operator and said housing wall; and
   a bias spring between said keeper plate and housing top surface to urge said valve out of contact with said valve seat to open said separator bore.

4. A valve control for an exhaust gas recirculation system as claimed in claim 3 wherein said valve positioned in said inlet chamber contacts and closes said separator bore in a reference position.

5. A valve control system for an exhaust gas recirculation system comprising:
   a valve assembly having a housing with a wall which defines a cavity, an inlet port, a discharge port, a top surface and a stem bore with a seal means positioned in said stem bore;
   drive means, including a direct current motor having a drive shaft extending therefrom and operable by said direct current motor;
   a cam operator connected for operation by said drive shaft;
   a separator mounted in said cavity and cooperating with said wall to define a discharge chamber and an inlet chamber;
      said discharge port communicating with said discharge chamber;
      said inlet port communicating with said inlet chamber;
   said separator also defining a valve seat and a separator bore communicating between said discharge and inlet chambers;
   a valve positioned in said discharge chamber and operable to seal said separator bore, said valve having a stem extending through said stem bore seal means to contact said cam operator;
   a keeper plate mounted on said stem between said cam operator and said housng wall; and a bias spring between said keeper plate and housing top surface to urge said valve into contact with said valve seat to seal said separator bore.

6. A valve control for an exhaust gas recirculation system as claimed in claim 5 wherein said valve positioned in said discharge chamber contacts and closes said separator bore in a reference position.

7. A valve control system for an exhaust gas recirculation system comprising:
- a valve assembly having a housing with a wall which defines a cavity, an inlet port, a discharge port, a top surface, and a stem bore with a seal means positioned in said stem bore;
- drive means, including a direct current motor, having a drive shaft extending therefrom and operable by said direct current motor;
- a cam operator connected for operation by said drive shaft;
- a separator mounted in said cavity and cooperating with said wall to define a discharge chamber and an inlet chamber;
- said discharge port communicating with said discharge chamber;
- said inlet port communicating with said inlet chamber;
- said separator also defining a valve seat and a separator bore communicating between said discharge and inlet chambers;
- a valve positioned in said inlet chamber and operable to seal said separator bore, said valve having a stem extending through said stem bore seal means to contact said cam operator;
- a keeper plate mounted on said stem between said cam operator and said housing wall; and
- a bias spring between said keeper plate and housing top surface to urge said valve out of contact with said valve seat to open said separator bore.

8. A valve control for an exhaust gas recirculation system as claimed in claim 7 wherein said valve positioned in said inlet chamber contacts and closes said separator bore in a reference position.

* * * * *